United States Patent [19]

Hirabayashi et al.

[11] Patent Number: 5,521,245
[45] Date of Patent: May 28, 1996

[54] SILICONE RUBBER COMPOSITIONS

[75] Inventors: Satao Hirabayashi; Yoshinori Inokuchi; Tsutomu Nakamura, all of Annaka, Japan

[73] Assignee: Shin-Etsu Chemical Co., Ltd., Tokyo, Japan

[21] Appl. No.: 267,700

[22] Filed: Jun. 29, 1994

[30] Foreign Application Priority Data

Jun. 30, 1993 [JP] Japan ................................ 5-187473

[51] Int. Cl.$^6$ ..................................... C08K 3/34
[52] U.S. Cl. ..................... 524/493; 524/500; 524/588; 525/478; 528/15; 528/31
[58] Field of Search .................... 524/493, 500, 524/588; 525/478; 528/15, 31

[56] References Cited

U.S. PATENT DOCUMENTS

| | | | |
|---|---|---|---|
| 4,077,943 | 3/1978 | Sato et al. | 525/478 |
| 4,761,454 | 8/1988 | Oba et al. | 525/478 |
| 4,824,616 | 4/1989 | Shimizu et al. | 525/478 |
| 4,879,339 | 11/1989 | Yoshino et al. | 525/478 |
| 4,886,865 | 12/1989 | Ikeno et al. | 525/478 |
| 5,082,596 | 1/1992 | Fukada et al. | 524/488 |
| 5,082,891 | 1/1992 | Morita et al. | 525/477 |
| 5,110,882 | 5/1992 | Hamada et al. | 525/478 |
| 5,216,104 | 6/1993 | Okami et al. | 525/478 |

*Primary Examiner*—Mark D. Sweet
*Attorney, Agent, or Firm*—Millen, White, Zelano, & Branigan

[57] ABSTRACT

A rubber compound comprising (A) an organopolysiloxane having at least two alkenyl groups in a molecule and (B) reinforcing silica powder is blended with (C) silicone elastomer particles obtained by reacting an organohydrogenpolysiloxane with a vinyl group-containing organopolysiloxane such that the molar ratio of $\equiv$SiH group to —CH=CH$_2$ group ranges from 1.2 to 5 and (D) a platinum catalyst to form a silicone rubber composition which cures into a product having high rubber strength despite the inclusion of silicone elastomer particles. The composition finds typical use as silicone rubber parts in copying machines.

16 Claims, No Drawings

SILICONE RUBBER COMPOSITIONS

BACKGROUND OF THE INVENTION

1. Field of the Invention

This invention relates to silicone rubber compositions having silicone elastomer particles blended therein so as to yield cured products having improved rubber strength.

2. Prior Art

Silicone rubber has heretofore been used in a variety of fields because of its heat resistance, low-temperature resistance and weatherability. It was recently proposed to disperse silicone elastomer particles in silicone rubber for achieving such improvements as stabilization of the electrical resistivity of semiconductive silicone rubber, tailoring of the surface state of silicone rubber moldings, and reduction of the hardness of silicone rubber. The silicone rubber compositions having silicone elastomer particles blended therein are thus used as the material for constructing rolls of business machines, typically copying machines.

Although addition and dispersion of silicone elastomer particles to silicone rubber is effective for achieving the improvements mentioned above, there is created an island-in-sea structure wherein the silicone elastomer particles are afloat in the silicone rubber. Since there is no interaction between the silicone rubber and the silicone elastomer particles, the addition of silicone elastomer particles to silicone rubber results in a substantial lowering of rubber strength.

Therefore, an object of the present invention is to provide a novel and improved silicone rubber composition which contains silicone elastomer particles and still yields a cured product having improved rubber strength.

SUMMARY OF THE INVENTION

The silicone elastomer particles which are conventionally blended in silicone rubber are those obtained by reacting an organohydrogenpolysiloxane with a vinyl group-containing organopolysiloxane such that the molar ratio of ≡SiH group in the former to —CH=CH$_2$ group in the latter, sometimes referred to as H/Vi ratio hereinafter for simplicity, may be approximately 1. Quite unexpectedly, the inventors have found that if an organohydrogenpolysiloxane is reacted with a vinyl group-containing organopoly-siloxane such that the H/Vi ratio may range from 1.2 to 5, there are obtained silicone elastomer particles in which some ≡SiH groups are left intact and that if these silicone elastomer particles are blended with organopolysiloxane, the resulting silicone rubber maintains acceptable rubber strength.

More particularly, when silicone elastomer particles obtained by reacting an organohydrogenpolysiloxane with a vinyl group-containing organopolysiloxane such that the H/Vi ratio may range from 1.2 to 5 are blended in a silicone rubber composition comprising an organopolysiloxane having at least two aliphatic unsaturated groups in a molecule and reinforcing silica powder having a specific surface of at least 50 m$^2$/g, the resulting silicone rubber composition is curable with either a platinum series catalyst alone or a mixed system of a platinum series catalyst and an organic peroxide catalyst. Upon curing, an interaction takes place such that the silicone elastomer particles are incorporated into the organopolysiloxane component having alkenyl groups through a crosslinking reaction. For this reason, the resulting silicone rubber composition yields cured products having high rubber strength despite the addition of silicone elastomer particles.

Briefly stated, the present invention provides a silicone rubber composition comprising (A) an organopolysiloxane of the following average compositional formula:

$$R_n{}^1SiO_{(4-n)/2} \tag{1}$$

wherein $R^1$ is independently selected from monovalent substituted or unsubstituted hydrocarbon groups and letter n is a positive number in the range of from 1.98 to 2.02, having at least two aliphatic unsaturated groups in a molecule, (B) reinforcing silica powder having a specific surface area of at least 50 m$^2$/g, (C) silicone elastomer particles obtained by reacting an organohydrogenpolysiloxane with a vinyl group-containing organopolysiloxane such that the molar ratio of ≡SiH group to —CH=CH$_2$ group ranges from 1.2 to 5, and (D) a platinum series catalyst or a mixed catalyst of a platinum series catalyst and an organic peroxide catalyst.

DETAILED DESCRIPTION OF THE INVENTION

The first essential component (A) of the silicone rubber composition according to the present invention is an organopolysiloxane of the following average compositional formula.

$$R_n{}^1SiO_{(4-n)2} \tag{1}$$

$R^1$ is independently selected from monovalent substituted or unsubstituted hydrocarbon groups and letter n is a positive number in the range of from 1.98 to 2.02. The preferred hydrocarbon groups represented by $R^1$ are monovalent substituted or unsubstituted hydrocarbon groups having 1 to 10 carbon atoms, more preferably 1 to 8 carbon atoms, including alkyl groups such as methyl, ethyl, propyl and butyl groups; cycloalkyl groups such as a cyclohexyl group; alkenyl groups such as vinyl, allyl, butenyl and hexenyl groups; aryl groups such as phenyl and tolyl groups; and substituted ones of these groups in which some or all of the hydrogen atoms attached to carbon atoms are substituted by halogen atoms, cyano groups or the like, such as chloromethyl, trifluoropropyl and cyanoethyl groups. $R^1$ may denote identical or different groups. The $R^1$ groups should include at least two aliphatic unsaturated groups or alkenyl groups per molecule. The content of aliphatic unsaturated groups in the $R^1$ groups is preferably 0.001 to 20 mol %, more preferably 0.025 to 5 mol %. The organopolysiloxanes of formula (1) are preferably straight chain, although, a mixture of two or more organopolysiloxanes having different molecular structures is acceptable. Preferably the organopolysiloxanes have an average degree of polymerization of about 100 to about 10,000, especially from about 5,000 to about 8,000.

The second essential component (B) of the inventive silicone rubber composition is reinforcing silica. In order that the silicone rubber have satisfactory mechanical strength, the silica powder should have a specific surface area of at least 50 m$^2$/g, preferably about 100 to about 300 m$^2$/g as measured by a BET method in a nitrogen atmosphere. with a specific surface area of less than 50 m$^2$/g, there results a cured product having low mechanical strength. Examples of the reinforcing silica include fumed silica, precipitated silica and modified silica products which are surface treated so as to be hydrophobic.

Preferably the reinforcing silica powder is added in amounts of about 5 to 70 parts, especially about 10 to 50 parts, by weight per 100 parts by weight of the first component or organopolysiloxane. Less than 5 parts of silica on this basis would be insufficient to achieve reinforcement whereas more than 70 parts of silica would detract from processability and rather adversely affect mechanical strength.

Specific silicone elastomer particles are blended in the silicone rubber composition as the third essential component (C). The silicone elastomer particles used herein are those obtained by reacting an organohydrogenpolysiloxane with a vinyl group-containing organopolysiloxane such that the H/Vi ratio ranges from 1.2 to 5, preferably from 1.5 to 3.5. When the H/Vi ratio is less than 1.2 or more than 5, the resulting silicone elastomer particles are not effective for improving the strength of the silicone rubber.

Examples of the silicone elastomer particles are gel particles and spherical particles obtained by the curing of a siloxane having vinyl groups by utilizing an organic hydrogen siloxane having SiH groups and platinum, or platinum group metal, catalysts.

For such elastomer particles prepared according to this method, the siloxanes having vinyl groups are those expressed, for example, by the following general formula (2):

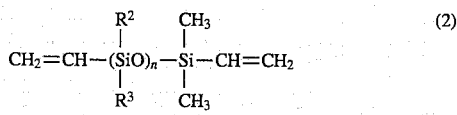

$$CH_2=CH-\underset{\underset{R^3}{|}}{\overset{\overset{R^2}{|}}{Si}}(SiO)_n-\underset{\underset{CH_3}{|}}{\overset{\overset{CH_3}{|}}{Si}}-CH=CH_2 \qquad (2)$$

wherein $R^2$ and $R^3$ are substituted or unsubstituted monovalent hydrocarbon groups, which may be the same or different, and n is a positive integer, preferably from 1 to 1,000, particularly from 50 to 500. Particular examples of $R^2$ and $R^3$ are the same groups listed for $R^1$ in the general formula (1). $R^2$ and $R^3$ are, preferably, methyl or vinyl groups.

The organohydrogen siloxane utilized along with the siloxane having vinyl groups possesses at least two hydrogen atoms bonded to silicon atoms in one molecule. Its molecular structure may be linear, branched, or cyclic. The degree of polymerization is desirably at most 300. Examples are: diorganopolysiloxane with terminals blocked by dimethyl hydrogen groups, co-polymers of dimethyl siloxane with methyl hydrogen siloxane units and terminal trimethyl siloxyl units, a low viscosity fluid comprising dimethyl hydrogen siloxane units [H(CH$_3$)$_2$SiO$_{0.5}$ units] and SiO$_2$ units, 1,3,5,7-tetrahydrogen -1,3,5,7-tetramethyl cyclotetrasiloxane, 1 -propyl-3,5,7-trihydrogen-1,3,5,7-tetramethyl cyclotetrasiloxane, and 1,5-dihydrogen-3,7-dihexyl 1,3,5,7-tetramethyl cyclotetra siloxane. These hydrogen siloxanes are utilized in amounts to provide 0.5 to 5 mole of SiH groups to one mole of vinyl group in the siloxanes having vinyl groups.

Platinum or platinum group metal compounds are utilized as a curing catalyst for the reaction between the siloxanes having vinyl groups and the organohydrogen siloxanes.

The most preferred silicone elastomer particles are spherical particles obtained by emulsion polymerization, in the presence of platinum type catalysts, of silicone oil having vinyl groups and silicone oil having organohydrogen siloxane.

The preparation of the silicone elastomer particles and the starting reactants, organo hydrogenpolysiloxane and vinyl group-containing organopolysiloxane used therein may be by a conventional method and the polysiloxane reactants are well known in the art, respectively. The present invention requires that when silicone elastomer particles are prepared from such conventional polysiloxane reactants by any desired conventional method, the H/Vi ratio range from 1.2 to 5 such that some ≡SiH groups remain in the silicone elastomer particles.

Insofar as the H/Vi ratio is in the range of 1.2 to 5, the silicone elastomer particles may be gel particles or spherical particles which are obtained by curing organohydrogen polysiloxanes and vinyl group-containing organopolysiloxanes in the presence of platinum series catalysts. Desirably used are silicone elastomer particles resulting from emulsion polymerization of a silicone oil containing a vinyl group and a silicone oil containing an excess of organohydrogenpolysiloxane in the presence of a platinum curing agent.

Preferably the silicone elastomer particles used herein have a mean particle size of about 0.1 to about 250 μm, more preferably about 0.5 to about 50 μm. It is difficult to produce particles to a mean particle size of less than 0.1 μm whereas those particles with a mean particle size of more than 250 μm would adversely affect the mechanical strength of cured rubber. The particle shape is not critical although spherical particles are preferred.

Preferably the silicone elastomer particles are added in amounts of about 5 to 200 parts, especially about 10 to 150 parts by weight per 100 parts by weight of component (A) or organopolysiloxane. As a rule, the silicone elastomer particles are added in appropriate amounts as needed by the rubber composition. Less than 5 parts of silicone elastomer particles on this basis would sometimes fail to achieve a substantial improvement in rubber physical properties whereas more than 200 parts of such particles would be difficult to blend with the remaining components and adversely affect physical or mechanical properties. When the amount of silicone elastomer particles blended exceeds 150 parts, the blending operation becomes inefficient and an undivided compound is formed with difficulty. Such difficulty of blending can be overcome by adding an appropriate amount of an organopolysiloxane in oil form which is defined as component (A), but has a low degree of polymerization, typically an average degree of polymerization of 200 to 1,000.

The fourth essential component (D) of the inventive silicone rubber composition is a catalyst which is a platinum series catalyst or a mixture of a platinum series catalyst and an organic peroxide catalyst. The platinum series catalyst is effective for promoting addition reaction between the organohydrogenpolysiloxane in the silicone elastomer particles as component (C) and the alkenyl groups in the organopolysiloxane component as component (A), thereby fixing the silicone elastomer particles by incorporating them into the crosslinkage. There may be used any of well-known platinum series catalysts including platinum element, platinum compounds, composite platinum compounds, chloroplatinic acid, and complexes of chloro-platinic acid with alcohols, aldehydes, ethers and olefins. The amount of platinum catalyst added is desirably in the range of 1 to 2,000 ppm of platinum atom based on the organopoly siloxane of component (A).

Examples of the organic peroxide catalyst used herein include benzoyl peroxide, 2,4 -dichlorobenzoyl peroxide, p-methylbenzoyl peroxide, 2,4-dicumyl peroxide, 2,5-dimethyl-(bis-2,5-t-butyl peroxy)hexane, di-t-butyl peroxide, and t-butyl perbenzoate. The amount of the organic peroxide catalyst added is desirably about 0.1 to 5 parts by weight per 100 parts by weight of the organopolysiloxane of component (A).

In addition to the platinum series catalyst, an organohydrogenpolysiloxane having at least two hydrogen atoms each directly attached to a silicon atom in a molecule is optionally used as a curing agent to induce addition reaction. Crosslinking can take place through these addition reactions for curing. At the same time, the silicone elastomer particles of component (C) are taken into the crosslinkage.

The organohydrogenpolysiloxanes used herein may be straight chain, branched or cyclic and preferably have a degree of polymerization of up to 300. Examples are diorganopolysiloxanes end-blocked with a dimethylhydrogensilyl group, copolymers composed of dimethylsiloxane units, methylhydrogen-siloxane units and terminal trimethylsiloxy units, low viscosity fluids composed of dimethylhydrogensiloxane units, that is, $H(CH_3)_2SiO_{1/2}$ units and $SiO_2$ units, 1,3,5,7-tetra-hydrogen-1,3,5,7-tetramethylcyclo -tetrasiloxane, 1-propyl-3,5,7-trihydrogen -1,3,5,7-tetramethylcyclotetrasiloxane, and 1,5-dihydrogen-3,7-dihexyl-1,3,5,7 -tetramethylcyclotetrasiloxane.

The organohydrogenpolysiloxane is added as the curing agent in such amounts that the hydrogen atoms directly attached to silicon atoms are about 50 to 500 mol % based on the moles of the alkenyl groups of the organopoly siloxane as component (A).

It is recommended to add such organo hydrogenpolysiloxane in the embodiment wherein only a platinum series catalyst is added as the catalyst or component (D) because there is a great tendency for an under-vulcanization condition when the silicone elastomer particles as component (C) are added in relatively small amounts. In contrast, the addition of organo hydrogenpolysiloxane is unnecessary in the embodiment wherein a platinum series catalyst is added along with an organic peroxide as the catalyst or component (D).

In addition to the essential components mentioned above, the silicone rubber composition of the invention may contain any desired optional components insofar as the objects of the invention are not impaired. For example, fillers such as ground quartz, calcium carbonate and carbon may be added as extenders. Inorganic or organic blowing agents may be added if it is intended to form spongy products. Exemplary blowing agents are azobisisobutyronitrile, dinitropentamethylenetetramine, and benzenesulfon hydrazide. They are preferably added in amounts of about 3 to 10 parts by weight per 100 parts by weight of the silicone rubber composition. By adding blowing agents to the inventive compositions, spongy silicone rubber products are obtained.

If desired, the inventive compositions may contain various other additives including coloring agents, heat resistance enhancing agents, reaction control agents, mold release agents and dispersants for fillers. Exemplary dispersants for fillers include diphenylsilane diol, various alkoxysilanes, carbon functional silanes, and silanol group-containing low molecular weight siloxanes. It is preferred to minimize the amounts of these optional components added so as not to detract from the benefits of the invention.

To render the silicone rubber compositions of the invention flame retardant or flame-proof, there may be added any additives well known for that purpose, for example, titanium dioxide, manganese carbonate, gamma-$Fe_2O_3$, ferrite, mica, glass fibers, and glass flakes.

The silicone rubber composition of the invention is prepared by uniformly mixing the above-mentioned components in a rubber kneading machine such as a two-roll mill, Banbury mixer, and dough mixer, followed by optional heat treatment. It is acceptable to previously mix the organopolysiloxane of component (A) and the reinforcing silica of component (B) to form a base compound and add thereto the silicone elastomer particles of component (C) and further the catalyst of component (D), followed by mixing.

The thus prepared silicone rubber composition can be molded into a shape suitable for an intended application by any desired molding method such as pressure molding in a mold and extrusion molding through a die.

There has been described a silicone rubber composition which contains silicone elastomer particles and still yields a cured product having improved rubber strength. Although fatigue performance and durability are not expected for conventional similar silicone rubber due to the lack of rubber strength, the silicone rubber composition of the invention which possesses all these abilities can be formed into useful silicon rubber members which find a variety of uses in business machines and precision equipment, especially in the proximity of the photoconductor drum in copying machines.

EXAMPLE

Examples of the present invention are given below by way of illustration and not by way of limitation. All parts are by weight.

Preparation Example 1

An organopolysiloxane composition having a molar ratio ($\equiv$SiH/Si —CH=$CH_2$) of 2 (two) was prepared by:

adding 10 parts by weight of methyl hydrogen polysiloxane (28 cSt at 25°), both molecular ends being terminated with tri methylsilyl groups, and consisting of 95 mol % of methylhydrogen siloxane units, and 5 mol % of dimethyl siloxane units, to 100 parts by weight of methylvinyl polysiloxane (200 cSt at 25° C.), both molecular ends being terminated with dimethylvinyl silyl groups, and consisting of 96 mol % of dimethyl siloxane units, and 4 mol % of methylvinyl siloxane units, an emulsion was prepared by adding 3 parts by weight of polyoxyethylene octylphenyl ether (H.L.B.=13.5), and 587 parts by weight of water to the above organopolysiloxane composition, mixing uniformly by homogenizer, and homogenizing by gaulin-homogenizer at 300 kg/cm². According to the above process, in the prepared emulsion, the maximum diameter of particles was 10 µm, and the average diameter in volume of particles was 1.0 µm.

Then, to 0.5 parts by weight of the emulsion, 0.06 parts by weight as the platinum amount of a complex of chloroplatinic acid with olefins was added for making a platinum-containing emulsion.

This platinum-containing emulsion was added and mixed with the remaining emulsion, and left for 20 hours at 25° C. for reaction. The result in the average diameter in volume of particles was 1.0 µm.

After spray-drying the prepared emulsion by spray dryer (Inlet Temp.=150° C., Outlet Tem. =80° C.), 102.5 parts by weight of spherical silicone elastomer particles were obtained (Yield: 94%, Diameters: 0.5–15 µm).

Example 1

To 100 parts of a rubbery organopoly siloxane consisting of 99.825 mol % of a dimethylsiloxane unit, 0.15 mol % of a methyl vinylsiloxane unit and 0.025 mol % of a dimethylvinylsiloxane unit and having an average degree of polymerization of about 5,000 were added 3 parts of diphenylsilane diol as a dispersant, 4 parts of silanol group-terminated dimethylpolysiloxane having a degree of polymerization of 10, and 40 parts of treated silica having a specific surface area of 200 m²/g (commercially available from Nippon Aerosil K.K.). The mixture was heat treated for two hours to form a base compound.

To 100 parts of the base compound was added 100 parts of spherical silicone elastomer particles obtained in Preparation Example 1 (H/Vi ratio of 2.0 and particle size of 0.5 to 15 μm). Using a pressure kneader, the mixture was fully kneaded.

100 parts of the thus obtained compound was further kneaded with 1.3 parts of 2,5-dimethyl-2,5-(t-butyl peroxy)hexane and 1.0 part of alcohol-modified chloroplatinic acid as curing agents. The resulting compound was compression molded into a sheet of 2 mm gage. The molding conditions included a temperature of 165° C., a pressure of 70 kgf/cm² and a time of 10 minutes.

Example 2

A silicone rubber sheet was formed by the same procedure as in Example 1 except that vulcanization was effected using 1.0 part of alcohol-modified chloroplatinic acid and 2.0 parts of a copolymer consisting of dimethyl siloxane and methylhydrogen units to give a H amount of 0.0035 mol/100 g as the curing agents.

Comparative Example 1

A silicone rubber sheet was formed by the same procedure as in Example 1 except that vulcanization was effected using 1.3 parts of 2,5-dimethyl-2,5-di-(t-butyl peroxy)hexane as the sole curing agent.

Comparative Example 2

A silicone rubber sheet was formed by preparing a base compound by the same procedure as in Example 1 except that spherical silicone elastomer particles obtained in a H/Vi ratio of 1/1 (particle size: 5 to 50 μm) were used, and kneading 100 parts of the base compound with 1.3 parts of 2,5-dimethyl-2,5-di(t-butyl peroxy)hexane and 1.0 part of alcohol-modified chloroplatinic acid as curing agents, followed by vulcanization.

Comparative Example 3

A silicone rubber sheet was formed by preparing a base compound by the same procedure as in Example 1 except that spherical silicone elastomer particles obtained in a H/Vi ratio of 1/1 (particle size: 5 to 50 μm) were used, and kneading 100 parts of the base compound with 1.3 parts of 2,5-dimethyl-2,5-di(t-butyl peroxy)hexane as the sole curing agent, followed by vulcanization.

The thus obtained silicone rubber sheets were post cured at 200° C. for 4 hours and measured for tensile strength as a measure indicative of rubber strength. The results are shown in Table 1.

TABLE 1

|  | Example | | Comparative Example | | |
| --- | --- | --- | --- | --- | --- |
|  | 1 | 2 | 1 | 2 | 3 |
| H/Vi ratio for silicone elastomer particles | 2.0 | 2.0 | 2.0 | 1.0 | 1.0 |

TABLE 1-continued

|  | Example | | Comparative Example | | |
| --- | --- | --- | --- | --- | --- |
|  | 1 | 2 | 1 | 2 | 3 |
| Platinum catalyst | added | added | no | added | no |
| Organic peroxide catalyst | added | no | added | added | added |
| Tensile strength, kg/cm² | 57.3 | 58.5 | 36.3 | 40.2 | 34.0 |

It is seen from Table 1 that the silicone rubber compositions of the invention (Examples 1 and 2) yield cured products having outstandingly improved rubber strength.

Examples 4–5 & Comparative Example 4

The procedure of Example 2 was repeated except that spherical silicone elastomer particles obtained in a H/Vi ratio of 1.2, 4.5 or 6.0 in the same manner as in Preparation Example 1 were used.

The results of tensile strength of the resulting silicone rubber sheets are shown in Table 2.

TABLE 2

|  | Example | | Comparative Example 4 |
| --- | --- | --- | --- |
|  | 3 | 4 |  |
| H/Vi ratio for silicone elastomer particles | 1.2 | 4.5 | 6.0 |
| Platinum catalyst | added | added | added |
| Organic peroxide catalyst | no | no | no |
| Tensile strength, kg/cm² | 54 | 56 | 42 |

Japanese Patent Application No. 5-187473 is incorporated herein by reference.

While this invention has been described with respect to a preferred embodiment, it will be understood by those skilled in the art that various changes and modifications may be made without departing from the spirit and scope of the invention.

We claim:

1. A silicone rubber composition comprising
   (A) 100 parts by weight of an organopolysiloxane of the following compositional formula:

$$R_n^1 SiO_{(4-n)/2} \qquad (1)$$ 

wherein $R^1$ is independently selected from monovalent substituted or unsubstituted hydrocarbon groups and letter n is a positive number in the range of from 1.98 to 2.02, having at least two aliphatic unsaturated groups in a molecule,
   (B) about 5 to about 70 parts by weight of reinforcing silica powder having a specific surface area of at least 50 m²/g,
   (C) about 5 to about 200 parts by weight of silicone elastomer particles obtained by reacting an organohydrogenpolysiloxane with a vinyl group-containing organopolysiloxane such that the molar ratio of ≡SiH group to —CH=CH₂ group ranges from 1.2 to 5, and
   (D) a platinum series catalyst optionally in admixture with an organic peroxide catalyst.

2. The composition of claim 1 wherein said silicone elastomer particles are obtained by reacting an organohydrogenpolysiloxane with a vinyl group-containing organopolysiloxane such that the molar ratio of ≡SiH group to —CH=CH$_2$ group ranges from 1.5 to 3.5.

3. The composition of claim 1 wherein said silicone elastomer particles have a mean particle size of about 0.1 to about 250 μm.

4. The composition of claim 1 wherein said platinum series catalyst (D) is present in such an amount to give about 1 to 2,000 parts by weight of elemental platinum per million parts by weight of the organopolysiloxane (A).

5. The composition of claim 1, wherein the silicone elastomer particles are spherical silicone elastomer particles.

6. The composition of claim 5, wherein said spherical silicone elastomer particles are obtained by emulsion polymerization of the organohydrogenpolysiloxane and the vinyl group-containing organopolysiloxane in the presence of a platinum catalyst.

7. The composition of claim 5, wherein said spherical silicone elastomer particles have a mean particle size of about 0.1 to about 250 μm.

8. The composition of claim 1, wherein, in component (A), $R^1$ is a substituted or unsubstituted monovalent hydrocarbon group of 1 to 10 carbon atoms.

9. The composition of claim 8, wherein, in component (A), $R^1$ is an alkyl, cycloalkyl, alkenyl, phenyl or tolyl group, optionally substituted by halogen atoms or cyano groups.

10. The composition of claim 1, wherein the reinforcing silica powder, (B), has a specific surface area of about 100 to about 300 m$^2$/g.

11. The composition of claim 1, wherein the vinyl group-containing organopolysiloxane used to obtain the silicone elastomer particles is of the following formula (2):

$$CH_2=CH-(SiO)_n-Si-CH=CH_2 \quad (2)$$
with $R^2$, $R^3$ on left Si and $CH_3$, $CH_3$ on right Si wherein $R^2$ and $R^3$ are the same or different substituted or unsubstituted monovalent hydrocarbon groups and n is a positive integer of 1 to 1000; and, the organohydrogenpolysiloxane used to obtain the silicone elastomer particles has at least two hydrogen atoms bonded to silicon atoms in a molecule and has a degree of polymerization of at most 300.

12. The composition of claim 11, wherein, in the organopolysiloxane of formula (2), $R^2$ and $R^3$ are independently an alkyl, cycloalkyl, alkenyl, phenyl or tolyl group, optionally substituted by halogen atoms or cyano groups.

13. The composition of claim 1, wherein the silicone elastomer particles (C) are present in an amount of 10 to 150 parts by weight per 100 parts by weight of the organopolysiloxane (A).

14. The composition of claim 1, wherein component (D) contains a platinum series catalyst in admixture with an organic peroxide catalyst.

15. The composition of claim 14, which contains no organohydrogenpolysiloxane component, other than that used to prepare the silicone elastomer particles, (C).

16. The composition of claim 14, wherein the organic peroxide is present in an amount of 0.1 to 5 parts by weight per 100 parts by weight of the organopolysiloxane (A).

* * * * *